United States Patent
Xiao et al.

(10) Patent No.: US 12,516,656 B2
(45) Date of Patent: Jan. 6, 2026

(54) ANTI-VORTEX-INDUCED VIBRATION CONTROL METHOD, APPARATUS, AND SYSTEM FOR WIND GENERATOR SET

(71) Applicant: GOLDWIND SCIENCE & TECHNOLOGY CO., LTD., Xinjiang (CN)

(72) Inventors: Fei Xiao, Beijing (CN); Yachao Ding, Beijing (CN); Jin Xie, Beijing (CN)

(73) Assignee: GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 0 days.

(21) Appl. No.: 18/294,601

(22) PCT Filed: Sep. 30, 2022

(86) PCT No.: PCT/CN2022/123260
§ 371 (c)(1),
(2) Date: Feb. 2, 2024

(87) PCT Pub. No.: WO2024/000902
PCT Pub. Date: Jan. 4, 2024

(65) Prior Publication Data
US 2024/0344498 A1   Oct. 17, 2024

(30) Foreign Application Priority Data
Jun. 30, 2022 (CN) .......................... 202210778989.3

(51) Int. Cl.
*F03D 7/02* (2006.01)
(52) U.S. Cl.
CPC ........ *F03D 7/0224* (2013.01); *F05B 2270/10* (2013.01); *F05B 2270/328* (2013.01); *F05B 2270/334* (2013.01)

(58) Field of Classification Search
CPC .............. F03D 7/0224; F05B 2270/328; F05B 2270/334
See application file for complete search history.

(56) References Cited

U.S. PATENT DOCUMENTS 11,268,275 B2 *   3/2022   Ma .......................... F03D 17/00
11,415,108 B2 *   8/2022   Ma .......................... F03D 13/20
(Continued)

FOREIGN PATENT DOCUMENTS

CN   102032110 A   4/2011
CN   111396249 A   7/2020
(Continued)

OTHER PUBLICATIONS

The International Search Report and Written Opinion mailed Dec. 14, 2022; PCT/CN2022/123260.
(Continued)

*Primary Examiner* — Tulsidas C Patel
*Assistant Examiner* — Thomas K Quigley

(57) ABSTRACT

A control method, apparatus and system for anti-vortex induced vibration of a wind turbine are provided. With the method, it is determined whether the wind turbine enters an anti-vortex induced vibration mode; an anti-vortex induced vibration function and triggering a window period is enabled in response to the wind turbine entering the anti-vortex induced vibration mode; and a blade of the wind turbine is adjusted to a preset anti-vortex induced vibration position in the window period, where the window period indicates a minimum time to complete the anti-vortex induced vibration function.

11 Claims, 8 Drawing Sheets

(56) References Cited

U.S. PATENT DOCUMENTS

| | | |
|---|---|---|
| 11,454,041 B2* | 9/2022 | Ma .................... E04H 12/00 |
| 11,655,798 B2* | 5/2023 | Lerner ................ F03D 9/25 |
| | | 290/55 |
| 11,879,425 B2* | 1/2024 | Danielsen ............ F03D 7/0224 |
| 12,012,934 B2* | 6/2024 | Motta .................. F03D 7/0298 |
| 12,037,984 B2* | 7/2024 | Danielsen ............ F03D 7/0224 |
| 2010/0133815 A1 | 6/2010 | Middendorf et al. |
| 2011/0076142 A1 | 3/2011 | Veldkamp et al. |
| 2015/0098820 A1 | 4/2015 | Dixon et al. |
| 2016/0032890 A1 | 2/2016 | Hammerum |
| 2023/0175487 A1* | 6/2023 | Motta .................. F03D 7/0298 |
| 2023/0175488 A1* | 6/2023 | Danielsen ............ F03D 7/0224 |
| 2023/0175489 A1* | 6/2023 | Danielsen ............ F03D 7/0224 |
| | | 416/1 |
| 2023/0243333 A1* | 8/2023 | Lerner ................ F03D 3/061 |
| | | 290/55 |
| 2023/0304477 A1* | 9/2023 | Bernhammer ........ F03D 1/0675 |

FOREIGN PATENT DOCUMENTS

| | | |
|---|---|---|
| CN | 112360684 A | 2/2021 |
| CN | 114676655 A | 6/2022 |
| EP | 2 306 005 A2 | 4/2011 |
| EP | 2 306 005 A3 | 2/2014 |
| EP | 3 926 161 A1 | 12/2021 |
| WO | 2011/051778 A1 | 5/2011 |

OTHER PUBLICATIONS

Extended European Search Report dated Oct. 22, 2024; Appln. No. 22948990.1.

* cited by examiner

ANTI-VORTEX-INDUCED VIBRATION CONTROL METHOD, APPARATUS, AND SYSTEM FOR WIND GENERATOR SET This application is a National Stage of International Application No. PCT/CN2022/123260, filed Sep. 30, 2022, which claims the benefit of and priority to Chinese patent application No. 202210778989.3, filed Jun. 30, 2022, the entireties of which are hereby incorporated herein by reference.

FIELD

The present disclosure relates to the field of wind power, and in particular to a control method, apparatus and system for anti-vortex induced vibration of a wind turbine generator system.

BACKGROUND

Fluid (wind) flowing over a surface of a slender cylinder (for example, a tower) may cause pairs of anti-symmetric vortices downstream due to the instability of a boundary layer. The generation and release of vortices are directly related to a periodic change of excitation on the surface of the tower. If an excitation frequency (fs) is close to a natural frequency (f) of the tower, vibration of the tower is amplified. Further, the vibration may in turn affects a flow field and intensifies the excitation, resulting in large-amplitude vibration. Such a fluid-solid coupling phenomenon is referred to as vortex induced vibration.

According to the dynamic simulation results, in a case that a wind turbine is shut down, if all three blades of the wind turbine stop at 90°, vortex induced vibration is easily excited. If one of the blades stops at 40°, the probability of exciting the vortex induced vibration may be greatly reduced.

In order to suppress vortex induced vibration, engineers are usually required to enter a hub of a wind turbine generator system (hereinafter also referred to as a "wind turbine"), manually change three blades of the wind turbine to anti-vortex induced vibration position, and manually yaw to perform an anti-vortex induced vibration function. However, the wind turbine cannot automatically resist vortex induced vibration after hoisting. On the other hand, after the wind turbine is connected to a power grid, in a case that the power grid is powered off, the three blades of the wind turbine cannot automatically stop at the anti-vortex induced vibration position. Thus, it is required to use other generators to supply power to a pitch system of the wind turbine, and manually change the three blades of the wind turbine to the anti-vortex induced vibration position. With these anti-vortex induced vibration methods in the conventional art, a lot of manpower is required and the economic cost is increased.

In addition, when there is a pitch failure, the pitch may no longer be able to meet a pitch requirement. In this case, if anti-vortex induced vibration is enforced, other unknown risks may arise. Therefore, when there is no pitch fault in the wind turbine, blades of the wind turbine should respectively stop at anti-vortex induced vibration position of, for example, 90°, −90°, and −40°. If a pitch failure occurs, blades of the wind turbine should respectively stop at normal stop position of 90°, −90°, and −90°.

On the other hand, as an example only, after the wind turbine stops at an anti-vortex induced vibration position, there may be a case that a wind speed is too high in a subsequent time period. If the wind speed is greater than a threshold, since a pitch angle of an anti-vortex induced vibration blade is, for example, 40° instead of 90°, a large fatigue load may be generated on the blade due to the large wind speed, resulting in an adverse effect on the safety of the wind turbine. In addition, as another example, after the wind turbine stops at an anti-vortex induced vibration pitch angle, since a pitch angle of an anti-vortex induced vibration blade is 40°, the blade may absorb wind energy to generate a certain lift, which may cause the wind turbine to rotate. Under anti-vortex induced vibration pitch angles of 90°, −90°, and −40°, if a rotating speed of the wind turbine exceeds a certain threshold, the aerodynamic imbalance of an impeller may increase a fatigue load of the wind turbine. In these cases, an anti-vortex induced vibration mode should be exited in time to ensure the safety of the wind turbine and reduce the fatigue load of the wind turbine.

Therefore, an anti-vortex induced vibration scheme in which an anti-vortex induced vibration mode may be automatically entered or exited based on a current situation of a wind turbine is required.

SUMMARY

In order to solve at least the above problems in the conventional art, a control method, apparatus and system for anti-vortex induced vibration of a wind turbine are provided according to the present disclosure.

A control method for anti-vortex induced vibration of a wind turbine is provided in an aspect of the present disclosure. The method includes: determining whether the wind turbine enters an anti-vortex induced vibration mode; enabling an anti-vortex induced vibration function and triggering a window period in response to the wind turbine entering the anti-vortex induced vibration mode; and adjusting a blade of the wind turbine to a preset anti-vortex induced vibration position in the window period, where the window period indicates a minimum time to complete the anti-vortex induced vibration function.

A controller for anti-vortex induced vibration of a wind turbine is provided in another aspect of the present disclosure. The controller includes: an anti-vortex induced vibration mode determination module configured to determine whether the wind turbine enters an anti-vortex induced vibration mode; an anti-vortex induced vibration triggering module configured to enable an anti-vortex induced vibration function and trigger a window period in response to the wind turbine entering the anti-vortex induced vibration mode; and an anti-vortex induced vibration execution module configured to adjust a blade of the wind turbine to a preset anti-vortex induced vibration position in the window period, where the window period indicates a minimum time to complete the anti-vortex induced vibration function.

A control system for anti-vortex induced vibration of a wind turbine is provided in another aspect of the present disclosure. The control system includes: a pitch system configured to adjust a position of a blade of the wind turbine; and a main control system configured to control an operation of the pitch system, where the pitch system is further configured to: determine whether the wind turbine enters an anti-vortex induced vibration mode; enable an anti-vortex induced vibration function and trigger a window period in response to the wind turbine entering the anti-vortex induced vibration mode; and adjust a blade of the wind turbine to a preset anti-vortex induced vibration position in the window period, where the window period indicates a minimum time to complete the anti-vortex induced vibration function.

A computer-readable storage medium storing a computer program is provided in another aspect of the present disclosure. The computer program, when executed by a processor, causes the processor to execute the control method for anti-vortex induced vibration of the wind turbine described above.

An electronic device is provided in another aspect of the present disclosure. The electronic device includes: a processor; and a memory configured to store a computer program which, when executed by the processor, causes the processor to execute the control method for anti-vortex induced vibration of the wind turbine described above.

Beneficial Effects

With the control method, apparatus and system for anti-vortex induced vibration of a wind turbine according to exemplary embodiments of the present disclosure, the wind turbine can automatically resist vortex induced vibration in various conditions (for example, an operation stage, a maintenance stage, a fault in a power grid), thus reducing the human workload and the economic loss. On the other hand, in some specific working conditions, considering the safety of the wind turbine, the wind turbine can also automatically exit an anti-vortex induced vibration mode to prevent the wind turbine from collapsing, thus ensuring the safety of the wind turbine. As a result, a fatigue load of the wind turbine and the economic loss can be reduced.

BRIEF DESCRIPTION OF THE DRAWINGS

These and/or other aspects and advantages of the present disclosure will become clear and easy to understand from the following detailed description of the embodiments of the present disclosure in conjunction with the drawings.

Hereinafter, the present disclosure will be described in detail with reference to the drawings. The same or similar elements will be indicated by the same or similar reference numerals throughout the drawings.

DETAILED DESCRIPTION OF EMBODIMENTS

Figure 1:
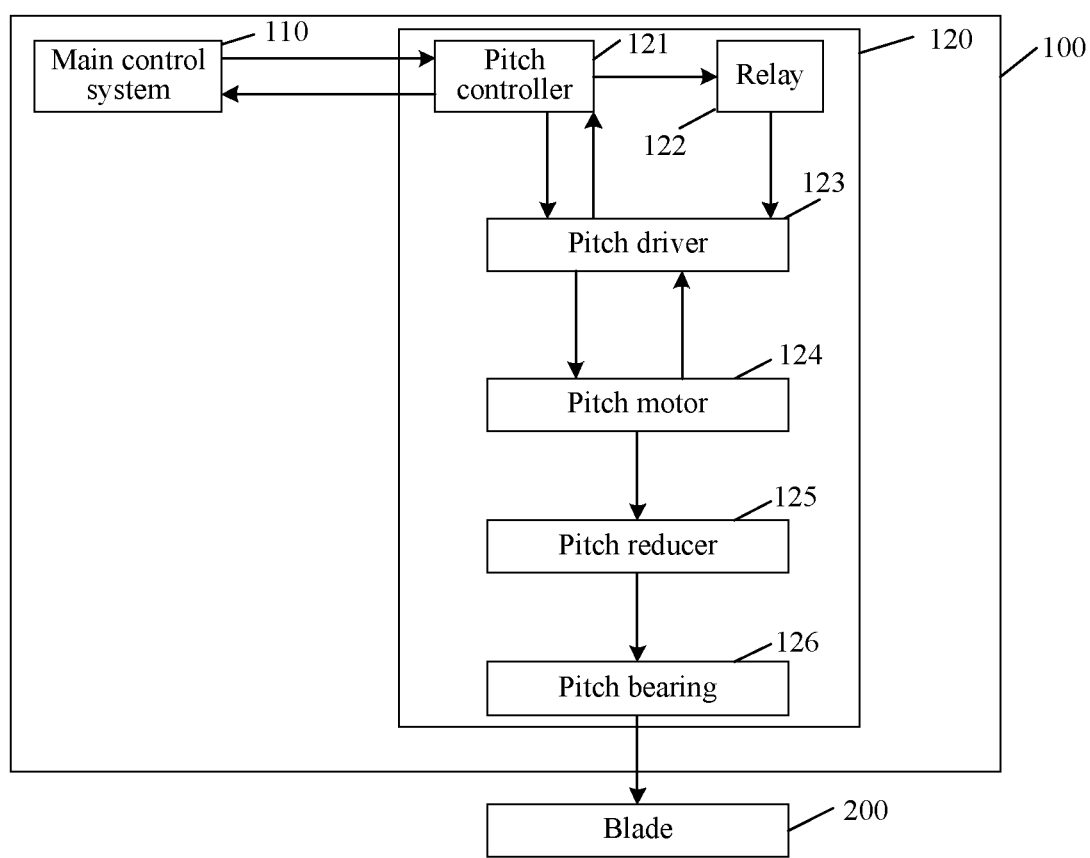
FIG. 1 shows a schematic structural diagram of a control system for anti-vortex induced vibration of a wind turbine 100 according to an exemplary embodiment of the present disclosure.

The following description with reference to the drawings is provided to fully understand the exemplary embodiments of the present disclosure defined by the claims and its equivalents. Various specific details are included to aid in understanding of the present disclosure, but these details are considered as exemplary only. Therefore, it is apparent to those skilled in the art that various changes and modifications may be made to the embodiments described herein without departing from the scope and spirit of the present disclosure. In addition, descriptions of known functions and configurations may be omitted for clarity and conciseness.

Before describing the present disclosure in detail, in order to understand the technical solution of the present disclosure easily, some technical terms and contents involved in the present disclosure are first explained.

Normal shutdown pitch angle: in a case that a wind turbine is shutdown, all three blades stop at about 90°, where 90° represents a normal shutdown pitch angle.

Anti-vortex induced vibration pitch angle: in a case that a wind turbine is shutdown, three blades stop respectively at 90°, −90°, and −X°, where X° represents an anti-vortex induced vibration pitch angle (hereinafter, 40° is taken as an example. However, it should be understood that different anti-vortex induced vibration pitch angles may be set for different types of wind turbines, and there may be a certain deviation between an actual angle and a desired angle of a blade, for example, there may be a deviation of ±0.5° or 1°).

Shutdown anti-vortex induced vibration mode: after a wind turbine enters a shutdown state, three blades are retracted to respective normal shutdown pitch angles, then an anti-vortex induced vibration blade automatically opens to an anti-vortex induced vibration pitch angle (for example, 40°), which is a shutdown anti-vortex induced vibration mode.

Planned power-off anti-vortex induced vibration mode: in a case that a power grid is about to be powered off, a wind turbine stops ahead of time and is prohibited from starting, to ensure that the wind turbine is still in an anti-vortex induced vibration state after the power grid is powered off. That is, pitch angles of the wind turbine are respectively kept at 90°, −90°, −40°, which is a planned power-off anti-vortex induced vibration mode. In addition, in the planned power-off anti-vortex induced vibration mode, the wind turbine should be aligned with a predicted main wind direction.

Unplanned power-off anti-vortex induced vibration mode: in a case that a wind turbine is in a process of startup, power generation, or shutdown, and a pitch angle of a blade is less than 40°, if the wind turbine is powered down due to power grid failure or wind turbine failure, the wind turbine enters an unplanned power-off anti-vortex induced vibration mode, and during emergency shutdown and retraction of the blades, an anti-vortex induced vibration blade stops at 40° and other blades stop at 90°. In addition, if a pitch angle of the anti-vortex induced vibration blade is greater than 40° during unplanned power down, due to a protection function of a safety chain of the wind turbine, the blade cannot open to a small angle. Therefore, the anti-vortex induced vibration blade cannot reach 40°, thus failing to perform an anti-vortex induced vibration function. In an exemplary embodiment of the present disclosure, an unplanned power-off anti-vortex induced vibration function is independently implemented by a pitch system of the wind turbine.

Forced anti-vortex induced vibration mode: in a case that a wind turbine is in a maintenance state or a power grid is powered off, and the wind turbine is powered by an external power supply, the wind turbine is controlled to enter an anti-vortex induced vibration state in response to a command sent manually, which is a forced anti-vortex induced vibration mode. In the forced anti-vortex induced vibration mode, the wind turbine should be aligned with a predicted main wind direction.

In the conventional art, a pitch system generally includes a normal-voltage pitch system and a low-voltage pitch system. The normal-voltage pitch system may include, for example, the "DEIF platform" or the "Inovance platform", and the low-voltage pitch system includes, for example, a "low-voltage platform".

Normal pitch mode: there is no fault in a pitch system, and a blade is operated under the control of a main control system of a wind turbine.

Pitch fault mode (or emergency shutdown mode): there is a fault in a pitch system, a blade is operated under the control of a pitch controller, and a blade is retracted to a normal shutdown pitch angle at a preset speed (for example, 2°/s).

Pitch anti-vortex induced vibration mode: it is a mode in which a pitch system performs an anti-vortex induced vibration function.

Pitch driver enabling: in a case that pitch driver enabling is cut off (for example, in a case that a pitch driver enabling signal is represented as a preset voltage (for example, 0V)), a pitch driver will achieve motor braking in a very short time, stop and hold the brake. In this case, a motor may not rotate for any operation.

Virtual limit of pitch driver: in a case that pitch driver enabling is cut off by a pitch controller, the pitch controller will set a virtual limit value (0° to 40°) for the pitch driver. In this case, even if the pitch driver enabling is restored, a motor may only operate between 0° and 40°, to ensure that a blade is not automatically retracted to a direction of 90° by the pitch driver before the communication between the pitch controller and the pitch driver is established after a wind turbine is powered on again. Here, a virtual limit may only be used for the DEIF platform, because in a case that the DEIF platform is powered on again, the pitch driver is initialized before the pitch controller. Before the communication between the pitch controller and the pitch driver is established, the pitch controller cannot output a pitch driver enabling cut-off signal. In a case that a safety chain is disconnected and a 89° switch is not triggered, retraction is automatically performed by the pitch driver. Therefore, it is required to enable a virtual limit function of the pitch driver to ensure that a current position of the pitch driver may remain unchanged even after the safety chain is disconnected in a case of completing anti-vortex induced vibration. However, it should be understood that the above virtual limit function may also be applied to other pitch platforms with similar problems as the DEIF platform.

Planned power-off window period: it is a time for an anti-vortex induced vibration blade to pitch from 90° to 40° during shutdown and from 40° to 90° during startup, which may be expressed by the following equation:

Planned power-off window period =

$$\left(0, \frac{90° - 40°}{\text{Pitch speed}} + \text{Compensation time}, 120\right)$$

The compensation time is a time in which a pitch controller cuts off pitch driver enabling and writes a virtual limit.

$$\left(\frac{90° - 40°}{\text{Pitch speed}} + \text{Compensation time}\right)$$

represents a time for an anti-vortex induced vibration blade to pitch from 90° to 40° and from 40° to 90°. 0 indicates that the anti-vortex induced vibration blade is at a target position without adjusting an angle, and 120 s represents the longest time of the window period. In addition, since only the DEIF platform requires to enable a pitch driver virtual limit function, a compensation time of the DEIF platform may be set higher than that of the Inovance platform and low-voltage platform. For example, the compensation time of the DEIF platform may be 30 s, and the compensation time of the Inovance platform and the low-voltage platform may be 10 s. In addition, a time length of the planned power-off window period may also be similarly applied to other cases in which an angle of an anti-vortex induced vibration blade is adjusted from a normal shutdown pitch angle to an anti-vortex induced vibration pitch angle in a case that a wind turbine is shutdown (for example, a forced anti-vortex induced vibration mode or a shutdown anti-vortex induced vibration mode).

Unplanned power-off window period: after unplanned power-down of a wind turbine, it is required to complete anti-vortex induced vibration attitudes of 90°, −90°, and −40° within a specified time, and the time spent in this process is a unplanned power-off window period, which may be expressed by the following equation:

Window period =

$$\left(\frac{90° - Y°}{\text{Retraction speed}} + \Delta, \frac{40° - Y°}{\text{Retraction speed}} + \text{Compensation time}, 120\right)$$

If a blade is at Y° in a case of power-down, it takes $$\frac{90° - Y°}{\text{Retraction speed}}$$

seconds for a wind turbine to adjust to anti-vortex induced vibration attitudes of 90°, −90°, and −40°, Δ is a preset deviation time, and a window period is at least a larger value among $$\left(\frac{90° - Y°}{\text{Retraction speed}} + \Delta, \frac{40° - Y°}{\text{Retraction speed}} + \text{Compensation time}\right),$$

with a maximum value of 120 seconds. For example, if a blade is at 0° in a case of power-down, a retraction speed is 1°/s, Δ is 5 s, a compensation time of the DEIF platform is 30 s, and a compensation time of the Inovance platform and the low-voltage platform is 10 s, this window period is at least 95 s.

Blade stuck: after an emergency stop and retraction is triggered for a wind turbine, before a blade reaches a safe position, if a pitch system determines that a blade change position is less than, for example, 1° within a preset time (for example, 5 s), it is determined that the blade is stuck. A blade stuck logic is applicable to any blade, and an anti-vortex induced vibration function cannot be performed after blade stuck. It should be understood that an anti-vortex induced vibration blade stops at an anti-vortex induced vibration position does not belong to blade stuck.

FIG. 1 is shows schematic structural diagram of a control system 100 for anti-vortex induced vibration of a wind turbine according to an exemplary embodiment of the present disclosure.

As shown in FIG. 1, a control system 100 for anti-vortex induced vibration may include a main control system 110 and a pitch system 120. The main control system 110 may control various operations of the pitch system 120, and the pitch system 110 may adjust a position of a blade 200 of a wind turbine. The pitch system 120 may include a pitch controller 121, a relay 122, a pitch driver 123, a pitch motor 124, a pitch reducer 125 and a pitch bearing 126.

The main control system 110 may send an anti-vortex induced vibration control word of the pitch system (which may be, for example, a 2-second pulse signal, with a control word of 0 indicating that an anti-vortex induced vibration function is enabled, 1 indicating that pitch driver enabling is cut off, and 2 indicating that an anti-vortex induced vibration function is exited), a given anti-vortex induced vibration position, an anti-vortex induced vibration speed, pitch enabling and other information to the pitch controller 121 in the pitch system 120 for various pitch control. The pitch controller 121 may feedback, to the main control system 110, information such as an anti-vortex induced vibration feedback word of the pitch system (which may be effective at a given level, for example, at a high level, with a feedback word of 0 indicating a feedback that an anti-vortex induced vibration mode is on, and 1 indicating a feedback that an anti-vortex induced vibration function is completed (for example, pitch driver enabling is switched to, and a virtual limit is set)), a pitch system fault word (which may be effective at a given level, for example, at a high level, including a fault word indicating the overtime of pitch anti-vortex induced vibration and a control word indicating a large deviation of a pitch anti-vortex induced vibration position), and a blade pitch actual position.

The pitch controller 121 may control whether the pitch driver is enabled or not by controlling the relay 122. When the contact of the relay 122 is disconnected, the pitch driver 123 is not enabled and stops working, and the pitch motor 124 stops rotating, so that the blade 200 may stop at the anti-vortex induced vibration position.

The pitch controller 121 controls the pitch driver 123 by a pitch speed and enabling a virtual limit function of the pitch driver 123, so that the pitch driver 123 drives the pitch motor 124 to a preset position.

The pitch driver 123 may feedback pitch positions of three blades and an anti-vortex induced vibration feedback signal to the pitch controller 121, to feed back to the pitch controller 121 whether the blade reaches the specified position and whether the anti-vortex induced vibration is completed.

The pitch driver 123 outputs control signals such as a voltage signal, a current signal and a braking signal to the pitch motor 124 to control the pitch motor 124. The pitch motor 124 drives the pitch reducer 125, which drives the pitch bearing 126 through a toothed belt, to control the blade 200 to rotate to the specified position.

The various apparatuses and components described above and their functions are known to those skilled in the art, which are not described in more detail here for the sake of brevity. A control method for anti-vortex induced vibration according to the present disclosure is described in detail with reference to FIG. 2.

Figure 2:
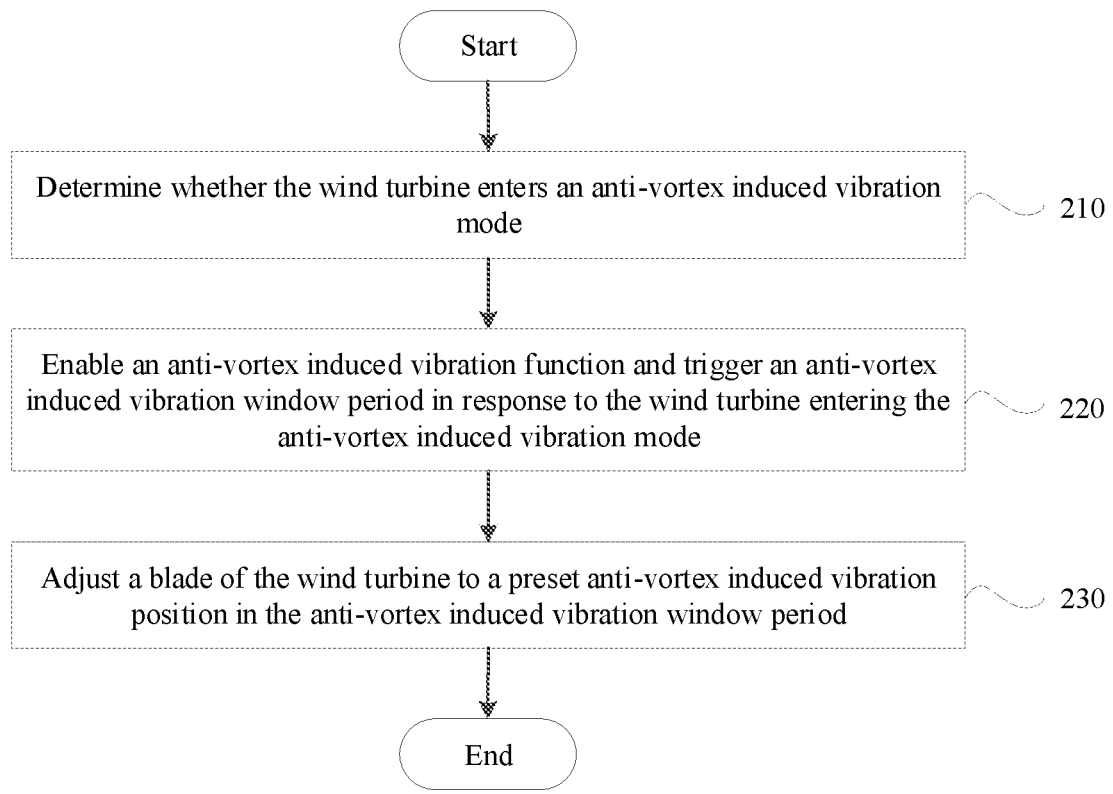
FIG. 2 shows a flowchart of a control method for anti-vortex induced vibration of a wind turbine according to an exemplary embodiment of the present disclosure.

FIG. 2 is a flowchart showing a control method for anti-vortex induced vibration of a wind turbine according to an exemplary embodiment of the present disclosure. The method shown in FIG. 2 may be implemented in the pitch system 120 of the wind turbine, which is explained in detail below.

With reference to FIG. 2, in step S210, whether the wind turbine enters an anti-vortex induced vibration mode may be determined.

As previously indicated, the anti-vortex induced vibration mode may include a shutdown anti-vortex induced vibration mode, a planned power-off anti-vortex induced vibration mode, an unplanned power-off anti-vortex induced vibration mode, and a forced anti-vortex induced vibration mode, which have been described in detail before, and are not repeated here.

In an exemplary embodiment of the present disclosure, a pitch system 120 may determine whether the wind turbine enters the anti-vortex induced vibration mode by determining whether an anti-vortex induced vibration start signal is received from a main control system 110, or determine whether the wind turbine enters the anti-vortex induced vibration mode by itself by determining whether a first preset condition for the unplanned power-off anti-vortex induced vibration mode is met. In response to receiving the anti-vortex induced vibration start signal from the main control system 110 or meeting the first preset condition for the unplanned power-off anti-vortex induced vibration mode, the pitch system 120 may determine that the wind turbine enters the anti-vortex induced vibration mode.

In an embodiment, in a case that the main control system 110 determines that a second preset condition for the shutdown anti-vortex induced vibration mode, a third preset condition for the planned power-off anti-vortex induced vibration mode or a fourth preset condition for the forced anti-vortex induced vibration mode is met, the main control system 110 may send an anti-vortex induced vibration start signal to the pitch system 120, so that the pitch system may perform the following operations. Alternatively, in a case of unplanned power-off, the pitch system 120 may also determine whether to enter the anti-vortex induced vibration mode by itself based on whether a first preset condition for the unplanned power-off anti-vortex induced vibration mode is met.

In an exemplary embodiment of the present disclosure, the first preset condition may include a condition in which the wind turbine is unplanned powered-off and a pitch angle of the blade of the wind turbine is smaller than an anti-vortex induced vibration pitch angle during unplanned power-off of the wind turbine. The second preset condition may include a condition in which the wind turbine is in a shutdown state and a shutdown anti-vortex induced vibration function is enabled. The third preset condition may include a condition in which the wind turbine is in a shutdown state and a planned power-off anti-vortex induced vibration function is enabled. The fourth preset condition may include a condition in which the wind turbine is in a shutdown or maintenance state and a forced anti-vortex induced vibration function is enabled. It should be understood that the setting of the above preset conditions is only used an example, which is not limited in the present disclosure, and specific contents of each of the preset conditions may be modified, added or deleted based on actual needs.

In step S220, in response to the wind turbine entering the anti-vortex induced vibration mode, an anti-vortex induced vibration function may be enabled and a window period may be triggered.

In an exemplary embodiment of the present disclosure, as previously explained, the window period may indicate a minimum time for the pitch system 120 to complete the anti-vortex induced vibration function, that is, a time required to adjust three blades of the wind turbine to 90°, −90°, and −40°, cut off pitch driver enabling of the pitch driver and write a virtual limit (in a case of the DEIF platform). As previously described, a length of the window period may depend on a preset pitch rate and a preset compensation time for the pitch driver (that is, a preset compensation time for cutting off pitch driver enabling of the pitch driver and writing a virtual limit), and also depends on an angle of a blade of the wind turbine during power-off in the unplanned power-off anti-vortex induced vibration mode.

Furthermore, in an exemplary embodiment of the present disclosure, triggering the window period refers timekeeping from the start of the window period until the end of the window period.

In step S230, a blade of the wind turbine may be adjusted to a preset anti-vortex induced vibration position in the window period.

In an embodiment, the pitch system 120 may first block a position comparison function of an anti-vortex induced vibration blade, and adjust a pitch angle of the anti-vortex induced vibration blade at the preset pitch rate. Generally, the position comparison function of the anti-vortex induced vibration blade is used to determine whether the blade is at a normal shutdown pitch angle. If the blade is not at the normal shutdown pitch angle, it is determined that a fault occurs in the wind turbine. In an exemplary embodiment of the present disclosure, which of the three blades of the wind turbine is selected as the anti-vortex induced vibration blade may be predetermined. For example, in a case that the wind turbine enters the anti-vortex induced vibration mode, the main control system 110 may send information of entering the anti-vortex induced vibration mode to the pitch system 120. Alternatively, a fixed blade (for example, a blade 1 #) may always be selected as the anti-vortex induced vibration blade for adjustment.

The pitch system 120 may detect whether the pitch angle of the anti-vortex induced vibration blade is adjusted to a preset anti-vortex induced vibration pitch angle. If the pitch angle of the anti-vortex induced vibration blade is not adjusted to the preset anti-vortex induced vibration pitch angle, the pitch angle of the anti-vortex induced vibration blade may be adjusted continually. If the pitch angle of the anti-vortex induced vibration blade is adjusted to the preset anti-vortex induced vibration pitch angle, and other blades except the anti-vortex induced vibration blade are at a normal shutdown pitch angle, it may be determined that the blade of the wind turbine have reached the preset anti-vortex induced vibration position.

In an exemplary embodiment of the present disclosure, the preset anti-vortex induced vibration position may be the previously exemplified position of 90°, −90°, and −40°, that is, the preset anti-vortex induced vibration pitch angle may be 40°, and the normal shutdown pitch angle may be 90°. Here, adjusting the anti-vortex induced vibration blade to the preset anti-vortex induced vibration pitch angle may mean adjusting the anti-vortex induced vibration blade to about 40°, with a certain deviation allowed.

In a case that the pitch angle of the anti-vortex induced vibration blade is adjusted to the preset anti-vortex induced vibration pitch angle, and pitch angles of the other two blades are at the normal shutdown pitch angle, it may be determined that the blades of the wind turbine reach the preset anti-vortex induced vibration position.

That is, in a case that the anti-vortex induced vibration mode is the shutdown anti-vortex induced vibration mode, or the planned power-off anti-vortex induced vibration mode, or the forced anti-vortex induced vibration mode, before anti-vortex induced vibration, the wind turbine is in a shutdown state, that is, positions of three blades are all at the shutdown pitch angle (for example, 90°). In this case, only a pitch angle of an anti-vortex induced vibration blade may be adjusted to the anti-vortex induced vibration pitch angle (for example, 40°), that is, the anti-vortex induced vibration blade may be controlled to reach the preset anti-vortex induced vibration position. However, in a case that the anti-vortex induced vibration mode is the unplanned power-off anti-vortex induced vibration mode, it means that the wind turbine may be in operation before power-off, and positions of three blades may be at an operating angle (for example, 0°). In this case, not only a pitch angle of an anti-vortex induced vibration blade should be adjusted to the anti-vortex induced vibration pitch angle (for example, 40°), but also pitch angles of other blades should be adjusted to the normal shutdown pitch angle (for example, 90°), so as to control blades of the wind turbine to reach the preset anti-vortex induced vibration position.

In an exemplary embodiment of the present disclosure, after the pitch angle of the anti-vortex induced vibration blade is adjusted to the preset anti-vortex induced vibration pitch angle, the pitch system 120 may cut off a pitch driver enabling signal of the anti-vortex induced vibration blade based on a pitch driver enabling cut-off signal sent by the main control system 110, that is, cut off a pitch driver enabling signal of the pitch driver 113 for driving the anti-vortex induced vibration blade to maintain the pitch angle of the anti-vortex induced vibration blade at the anti-vortex induced vibration pitch angle. It should be understood that in an exemplary embodiment of the present disclosure, in a case that the pitch system 120 adjusts an angle of a blade, the pitch system 120 may continuously send information such as the angle of the blade to the main control system 110, so that the main control system 110 may generate a pitch system control signal in real time based on the information. For example, the main control system 110 may determine whether the anti-vortex induced vibration blade reaches the anti-vortex induced vibration pitch angle based on the information such as the angle of the blade sent by the pitch system 120, and send a driver enabling cut-off signal to the pitch system 120 in a case that the anti-vortex induced vibration blade reaches the anti-vortex induced vibration pitch angle.

After the blade of the wind turbine reaches the preset anti-vortex induced vibration position, the pitch driver enabling signal is cut off and the virtual limit is written (in a case of the DEIF platform), it may be determined that the wind turbine has completed an anti-vortex induced vibration operation. In this case, the pitch system 120 may feedback an anti-vortex induced vibration completion signal to the main control system 110.

Furthermore, the control method for anti-vortex induced vibration according to the exemplary embodiment of the present disclosure may further include automatically exiting the anti-vortex induced vibration mode in some cases in addition to automatically entering the anti-vortex induced vibration mode as described above.

In an exemplary embodiment of the present disclosure, in a case that the wind turbine reaches a preset exit condition, the pitch system 120 may exit the anti-vortex induced vibration mode. Exit conditions for different anti-vortex induced vibration modes are listed below.

Exit Conditions for the Shutdown Anti-Vortex Induced Vibration Mode

In a case of any of the following working conditions, after being shutdown, a wind turbine does not enter the shutdown anti-vortex induced vibration mode, and a wind turbine that has entered the shutdown anti-vortex induced vibration mode is required to exit the shutdown anti-vortex induced vibration mode:
 a) NA overspeed is triggered in the wind turbine;
 b) before anti-vortex induced vibration of the wind turbine is completed, a pitch fault is triggered;
 c) before anti-vortex induced vibration of the wind turbine is completed, a power grid fault is triggered (that is, before the power grid is powered off, even if the wind turbine has not completed the anti-vortex induced vibration, the wind turbine will retract to the normal shutdown pitch angle);
 d) after anti-vortex induced vibration of the wind turbine is completed, a rotating speed of the wind turbine exceeds an anti-vortex induced vibration rotating speed threshold (to prevent an impeller of the wind turbine from rotating in the anti-vortex induced vibration mode, resulting in an excessive fatigue load);
 e) after anti-vortex induced vibration of the wind turbine is completed, an average wind speed in 10 min exceeds an anti-vortex induced vibration wind speed threshold;
 f) the wind turbine meets a startup condition (that is, before startup, the wind turbine is required to exit the shutdown anti-vortex induced vibration mode, retract to the normal shutdown pitch angle, and then start based on a startup process); and
 g) the wind turbine is not in a shutdown state (that is, in the shutdown anti-vortex induced vibration mode, if operation and maintenance personnel manually adjust the wind turbine to a maintenance mode, the wind turbine exits the shutdown anti-vortex induced vibration mode and retracts to the normal shutdown pitch angle).

Exit Conditions for the Planned Power-Off Anti-Vortex Induced Vibration Mode

In a case of any of the following working conditions, the wind turbine can not enter the planned power-off anti-vortex induced vibration mode, and a wind turbine that has entered the planned power-off anti-vortex induced vibration mode is required to exit the planned power-off anti-vortex induced vibration mode:
 a) NA overspeed is triggered in the wind turbine;
 b) before anti-vortex induced vibration of the wind turbine is completed, a pitch fault is triggered;
 c) before anti-vortex induced vibration of the wind turbine is completed, a power grid fault is triggered (that is, before the power grid is powered off, even if the wind turbine has not completed the anti-vortex induced vibration, the wind turbine will retract to the normal shutdown pitch angle);
 d) after anti-vortex induced vibration of the wind turbine is completed, a rotating speed of the wind turbine exceeds an anti-vortex induced vibration rotating speed threshold (to prevent an impeller of the wind turbine from rotating in the anti-vortex induced vibration mode, resulting in an excessive fatigue load);
 e) after anti-vortex induced vibration of the wind turbine is completed, an average wind speed in 10 min exceeds an anti-vortex induced vibration wind speed threshold;
 f) the wind turbine is not in a shutdown state (that is, in the shutdown anti-vortex induced vibration mode, if operation and maintenance personnel manually adjust the wind turbine to a maintenance mode, the wind turbine exits the shutdown anti-vortex induced vibration mode and retracts to the normal shutdown pitch angle); and
 g) Planned power-off anti-vortex induced vibration is closed (this close command can only be effective after manual confirmation or central control confirmation).

Exit Conditions for the Forced Anti-Vortex Induced Vibration Mode

In a case of any of the following working conditions, the wind turbine can not enter the forced anti-vortex induced vibration mode, and a wind turbine that has entered the forced anti-vortex induced vibration mode is required to exit the forced anti-vortex induced vibration mode:
 a) before anti-vortex induced vibration of the wind turbine is completed, a pitch fault is triggered;
 b) after anti-vortex induced vibration of the wind turbine is completed, a rotating speed of the wind turbine exceeds an anti-vortex induced vibration rotating speed threshold (to prevent an impeller of the wind turbine from rotating in the anti-vortex induced vibration mode, resulting in an excessive fatigue load);
 c) after anti-vortex induced vibration of the wind turbine is completed, an average wind speed in 10 min exceeds an anti-vortex induced vibration wind speed threshold;
 d) an impeller is locked (that is, after this locking action is triggered, it is determined that there is a possibility for maintenance personnel to enter a hub, and in this case, a blade is required to retract to the normal shutdown pitch angle);
 e) an emergency door is opened (that is, after this opening action is triggered, it is determined that there is a possibility for maintenance personnel to enter a hub, and in this case, a blade is required to retract to the normal shutdown pitch angle); and
 f) forced anti-vortex induced vibration is closed (this close command can only be effective after manual confirmation).

Exit conditions for the unplanned power-off anti-vortex induced vibration mode may be the same as those for the anti-vortex induced vibration modes described above, which are not repeated here.

In an exemplary embodiment of the present disclosure, in a case that the main control system 110 detects that one of the above exit conditions is met, the main control system 110 may send an exit anti-vortex induced vibration signal to the pitch system 120. In a case that the pitch system 120 receives the exit anti-vortex induced vibration signal from the main control system 110, the pitch system 120 may perform an operation of exiting the anti-vortex induced vibration mode, trigger a window period (a length of the window period triggered in this case is the same as that of the window period used in a case of entering the anti-vortex induced vibration mode), restore the pitch driver enabling signal of the anti-vortex induced vibration blade, adjust the blade of the wind turbine to a shutdown position in the window period, and enable the position comparison function of the anti-vortex induced vibration blade in a case that the window period is over, so that the pitch system 120 may normally perform a position comparison function of the blade.

In addition, in a case that the pitch system 120 itself detects that one of the above exit conditions is met, for example, in a case that the pitch system 120 detects a pitch fault in the anti-vortex induced vibration mode, the pitch system 120 may restore the pitch driver enabling signal of the anti-vortex induced vibration blade and enable the position comparison function of the anti-vortex induced vibration blade, so that the blade may automatically return to the normal shutdown pitch angle.

Anti-vortex induced vibration processes and processes of exiting an anti-vortex induced vibration mode of the main control system 110 and the pitch system 120 in different anti-vortex induced vibration modes are described in detail with reference to FIGS. 3 to 7.

Figure 3:
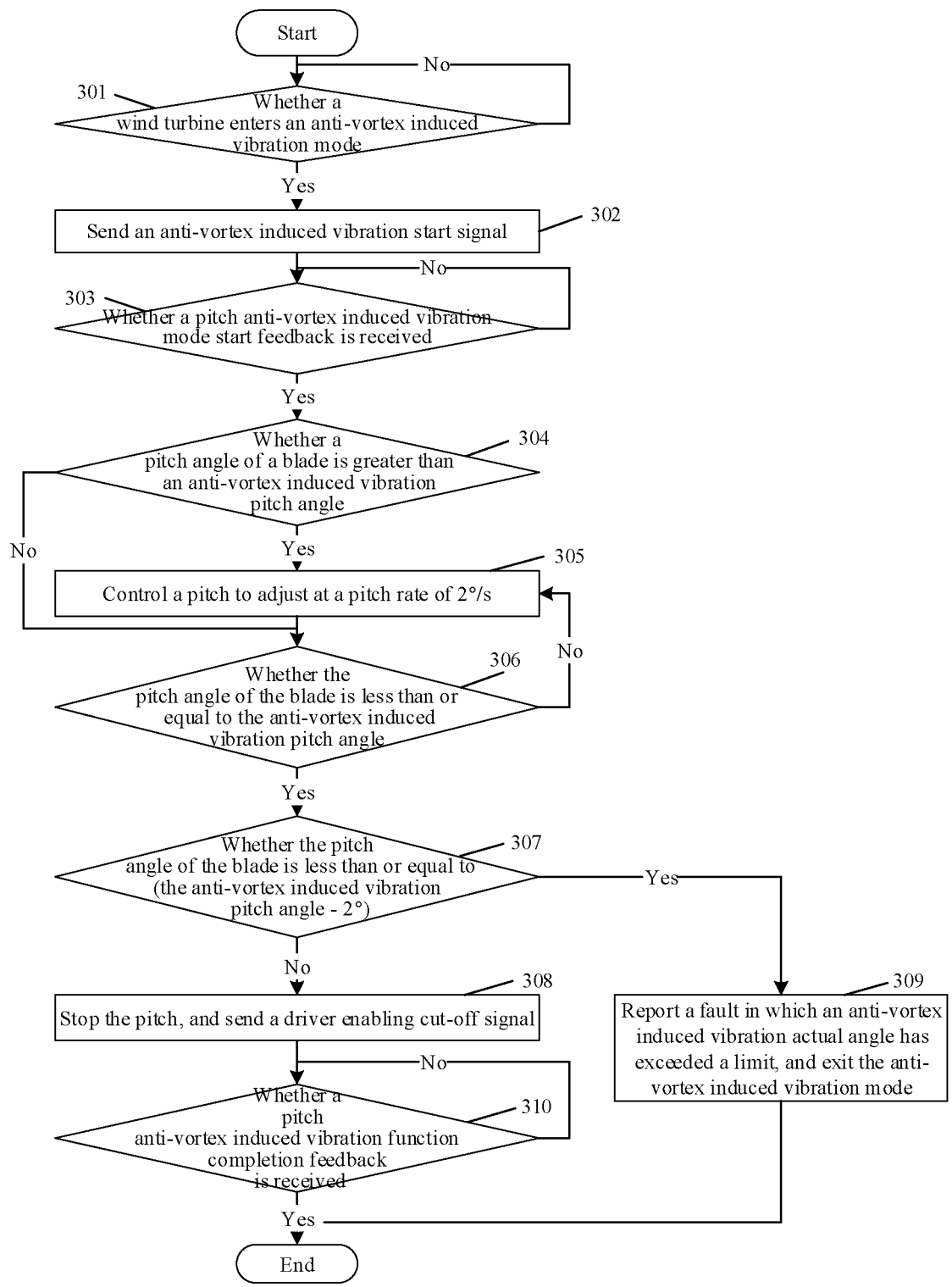
FIG. 3 shows an example flowchart of an anti-vortex induced vibration process of a main control system 110 according to an exemplary embodiment of the present disclosure.

FIG. 3 shows an example flowchart of an anti-vortex induced vibration process of a main control system 110 according to an exemplary embodiment of the present disclosure.

Since the unplanned power-off anti-vortex induced vibration mode is independently completed by the pitch system 120, the flowchart of FIG. 3 is only applicable for the shutdown anti-vortex induced vibration mode, the planned power-off anti-vortex induced vibration mode and the forced anti-vortex induced vibration mode.

As shown in FIG. 3, in step 301, a main control system 110 may determine whether a wind turbine enters an anti-vortex induced vibration mode. In a case that the wind turbine enters the anti-vortex induced vibration mode, in step 302, the main control system 110 may send an anti-vortex induced vibration start signal (for example, a 2-second pulse) to a pitch system 120. Then, in step 303, the main control system 110 may determine whether an anti-vortex induced vibration mode start feedback signal is received from the pitch system 120. After receiving the anti-vortex induced vibration mode start feedback signal, in step 304, the main control system 110 may block a position comparison function of an anti-vortex induced vibration blade, detect a pitch angle of the anti-vortex induced vibration blade, and determine whether the pitch angle is greater than an anti-vortex induced vibration pitch angle. In a case that the pitch angle of the anti-vortex induced vibration blade is greater than the anti-vortex induced vibration pitch angle ("Yes" in 304), the main control system 110 may determine that the pitch angle of the anti-vortex induced vibration blade is required to be adjusted, and control the pitch system 120 to adjust the anti-vortex induced vibration blade at a preset pitch rate (for example, 2°/s) (step 305). Then, it is continuously detected whether the pitch angle of the anti-vortex induced vibration blade is greater than the anti-vortex induced vibration pitch angle (step 306), and return to step 305 to continue to adjust the pitch angle if the pitch angle is greater than the anti-vortex induced vibration pitch angle ("No" in step 306). Otherwise, in a case that the pitch angle of the anti-vortex induced vibration blade is not greater than the anti-vortex induced vibration pitch angle ("No" in step 304, "Yes" in step 306), the main control system 110 may determine whether the pitch angle of the anti-vortex induced vibration blade is greater than (the anti-vortex induced vibration pitch angle−2°). Here, 2° is only an example, which may be determined based on an actual situation. In a case that the pitch angle of the anti-vortex induced vibration blade is not greater than (the anti-vortex induced vibration pitch angle−2°) ("Yes" in step 307), it indicates that an anti-vortex induced vibration actual angle has exceeded a limit. Therefore, it is required to exit the anti-vortex induced vibration mode (step 309). In a case that the pitch angle of the anti-vortex induced vibration blade is greater than (the anti-vortex induced vibration pitch angle−2°) ("No" in step 307), it indicates that the anti-vortex induced vibration angle is normal. Therefore, the pitch may be stopped, and a driver enabling cut-off signal is sent to the pitch system 120 (step 308) to cut off pitch driver enabling of the pitch system 120. Then, it is determined whether an anti-vortex induced vibration function completion feedback sent by the pitch system 120 is received (step 310). It the feedback is received, it indicates that the anti-vortex induced vibration process has been completed by the pitch system 120.

Figure 4:
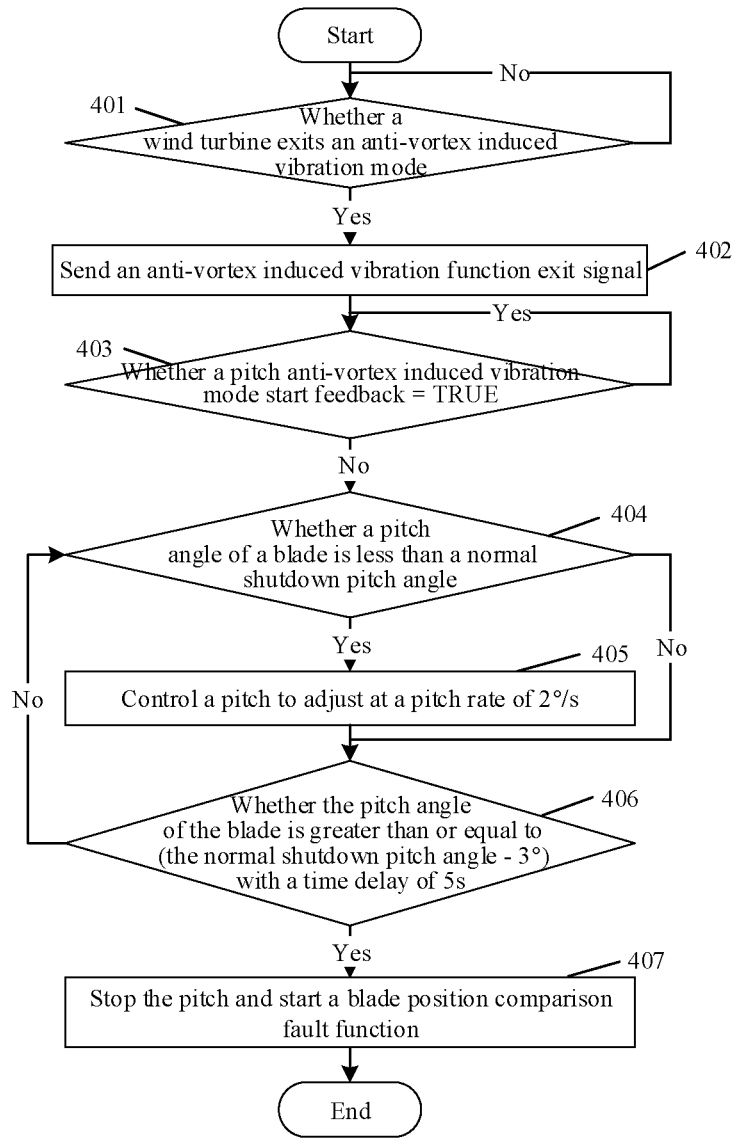
FIG. 4 shows an example flowchart of a process of exiting an anti-vortex induced vibration mode of a main control system 110 according to another exemplary embodiment of the present disclosure.

FIG. 4 shows an example flowchart of a process of exiting an anti-vortex induced vibration mode of a main control system 110 according to an exemplary embodiment of the present disclosure.

As shown in FIG. 4, in step 401, a main control system 110 may determine whether a wind turbine exits an anti-vortex induced vibration mode (for example, exits the anti-vortex induced vibration mode based on whether one of preset exit conditions is met). In a case of determining that the wind turbine exits the anti-vortex induced vibration mode, in step 402, the main control system 110 may send an anti-vortex induced vibration function exit signal (for example, a 2-second pulse) to a pitch system 120. Then, in step 403, the main control system 110 may determine whether the feedback of an anti-vortex induced vibration mode on received from the pitch system 120 is TRUE. If the feedback of anti-vortex induced vibration mode on is TRUE ("Yes" in 403), the main control system 110 continues to wait. If the feedback of anti-vortex induced vibration mode on is FALSE ("No" in 403), in step 404, the main control system 110 detects a pitch angle of an anti-vortex induced vibration blade to determine whether the pitch angle is smaller than a normal shutdown pitch angle. In a case that the pitch angle of the anti-vortex induced vibration blade is less than the normal shutdown pitch angle ("Yes" in 404), the main control system 110 may determine that it is required to adjust the pitch angle of the anti-vortex induced vibration blade, and control the pitch system 120 to adjust the anti-vortex induced vibration blade in a direction of the normal shutdown pitch angle at a preset pitch rate (for example, 2°/s) in step 405. Then, in step 406, it is continuously detected whether the pitch angle of the anti-vortex induced vibration blade is greater than or equal to (the normal shutdown pitch angle−2°) with a period of time (for example, 5 s) lasting. Here, 2° is only an example, which may be determined based on an actual situation. In a case that the pitch angle of the anti-vortex induced vibration blade is greater than or equal to (the normal shutdown pitch angle−2°) with a period of time lasting ("Yes" in step 406), the pitch may be stopped and a position comparison function of the anti-vortex induced vibration blade may be enabled (step 407). In addition, in a case of determining in step 404 that the pitch angle of the anti-vortex induced vibration blade is not less than the anti-vortex induced vibration pitch angle ("No" in 404), the main control system 110 may perform step 406 and subsequent operations.

Figure 5:
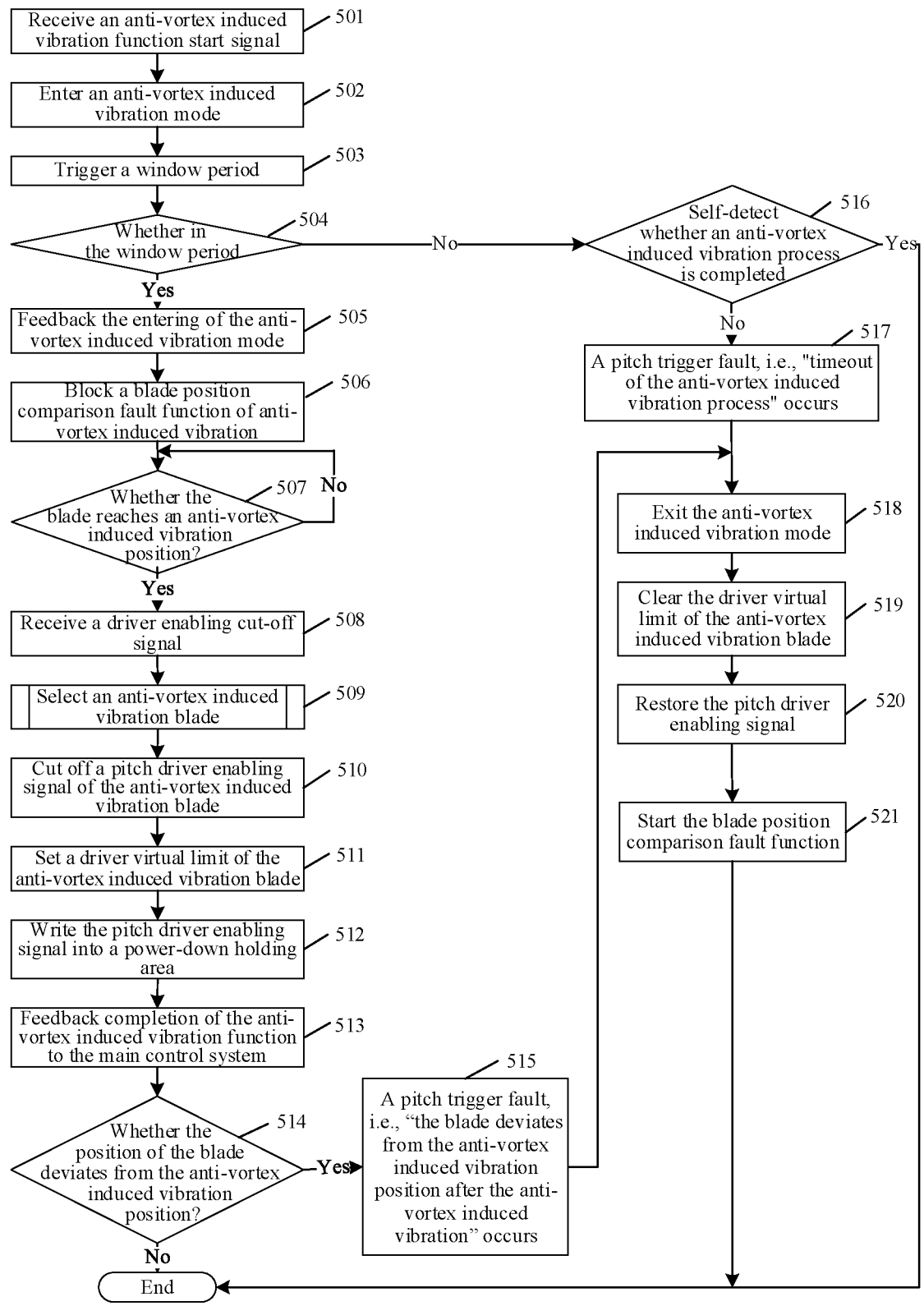
FIG. 5 shows an example flowchart of an anti-vortex induced vibration process of a pitch system 120 according to an exemplary embodiment of the present disclosure.

FIG. 5 shows an example flowchart of an anti-vortex induced vibration process of a pitch system 120 according to an exemplary embodiment of the present disclosure. The flowchart of FIG. 5 is only applicable for the shutdown anti-vortex induced vibration mode, the planned power-off anti-vortex induced vibration mode and the forced anti-vortex induced vibration mode.

As shown in FIG. 5, in step 501, a pitch system 120 may receive an anti-vortex induced vibration function enable signal sent by a main control system 110, enter an anti-vortex induced vibration mode in step 502 and trigger a window period in step 503. Then, in step 504, it may be determined whether it is in the window period or not at present. If it is in the window period at present ("Yes" in step 504), an anti-vortex induced vibration mode on feedback is sent to the main control system 110 in step 505 to indicate entering of the anti-vortex induced vibration mode, and a position comparison function of an anti-vortex induced vibration blade is blocked in step 506. During this process, the pitch system 120 may continuously send angles of the anti-vortex induced vibration blade to the main control system 110. In step 507, the pitch system 120 may adjust the position of the anti-vortex induced vibration blade of the wind turbine and determine whether three blades of the wind turbine reach preset anti-vortex induced vibration positions. If the three blades of the wind turbine reach the preset anti-vortex induced vibration positions ("Yes" in step 507), a driver enabling cut-off signal is received from the main control system 110 in step 508. The anti-vortex induced vibration blade is selected in step 509 (this step is performed on the premise that the main control system 110 sends information of the determined specific anti-vortex induced vibration blade to the pitch system 120, and it is not required to perform this step if the anti-vortex induced vibration blade is a fixed blade). A pitch driver enabling signal of the anti-vortex induced vibration blade is cut off in step 510 (in this case, the pitch driver enabling signal may also be cut off after further determining that a shutdown position of the blade is the same as the preset anti-vortex induced vibration position (there may be some errors)). Then, in step 511, a driver virtual limit of the anti-vortex induced vibration blade is set (which is only performed for the DEIF platform, and may be omitted for other platforms). In step 512, the pitch driver enabling signal is written into a power-down holding area. In step 513, an anti-vortex induced vibration function completion feedback is sent to the main control system 110 to indicate completion of the anti-vortex induced vibration function. In step 514, the pitch system 120 may further determine whether the position of the blade deviates from the preset anti-vortex induced vibration position after the anti-vortex induced vibration function is completed. If there is no deviation ("No" in step 514), it indicates that the anti-vortex induced vibration is successful, and process ends. If the position of the blade deviates from the preset anti-vortex induced vibration position ("Yes" in step 514), it is determined in step 515 that a pitch trigger fault, i.e., "the blade deviates from the anti-vortex induced vibration position after the anti-vortex induced vibration" occurs. In this case, a process of exiting the anti-vortex induced vibration mode can be performed. In step 518, the anti-vortex induced vibration mode is exited, In step 519, the driver virtual limit of the anti-vortex induced vibration blade is cleared (which is only performed for the DEIF platform, and may be omitted for other platforms). In step 520, the pitch driver enabling signal is restored. In step 521, the position comparison function of the anti-vortex induced vibration blade is enabled (that is, cancel the blocking). In this case, because the position comparison function of the anti-vortex induced vibration blade has been enabled, blades of the wind turbine may be automatically adjusted to a shutdown pitch angle under the control of this function.

In addition, if it is determined in step 504 that it is not in the window period at present ("No" in step 504), the pitch system may determine whether an anti-vortex induced vibration process is completed by itself in step 516. If the anti-vortex induced vibration process is completed ("Yes" in step 516), the process ends. If the anti-vortex induced vibration process is not completed ("No" in step 516), it is determined in step 517 that a pitch trigger fault, i.e., "timeout of the anti-vortex induced vibration process" occurs, and step 518 and exit of the anti-vortex induced vibration process thereafter are performed.

Figure 6:
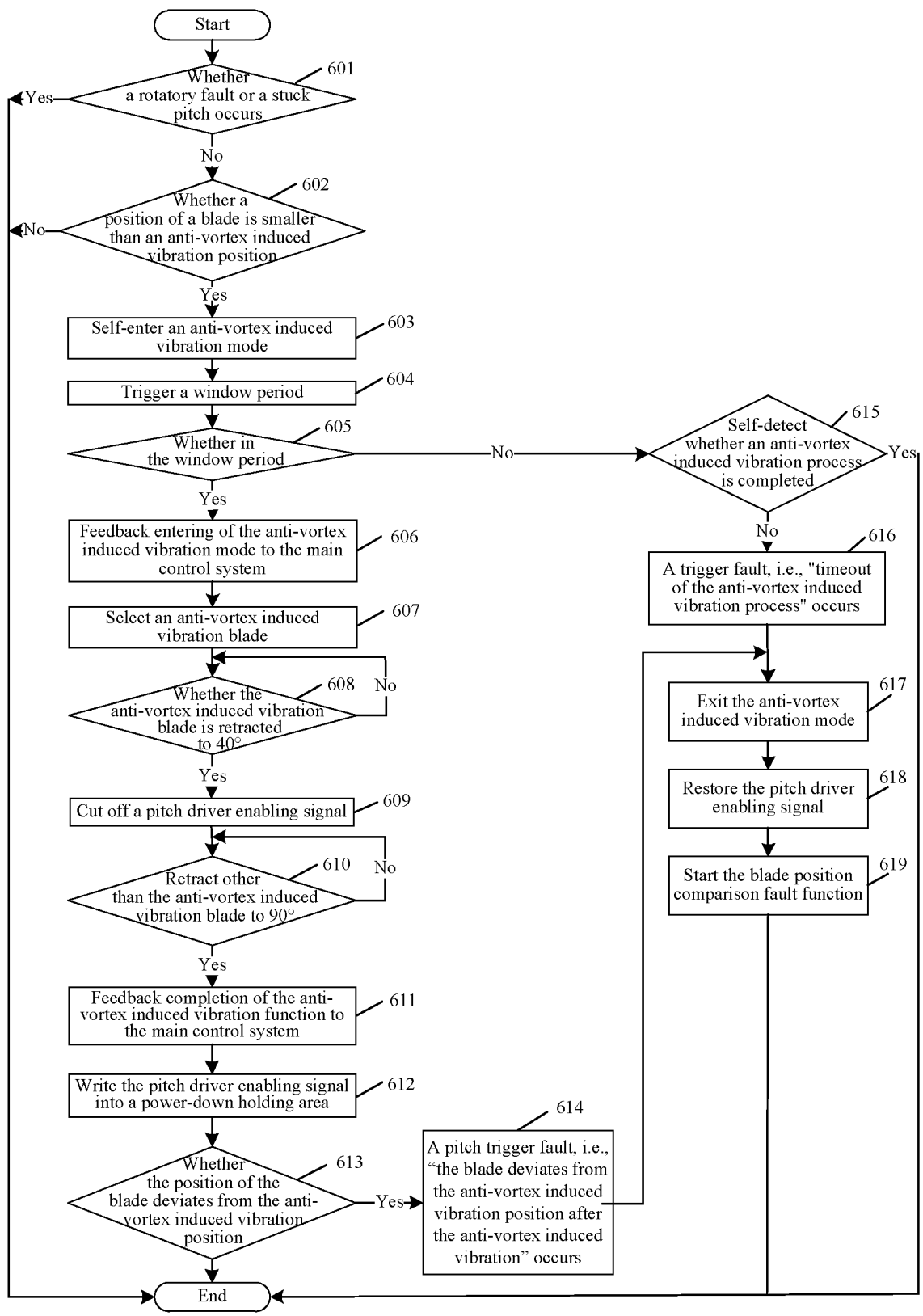
FIG. 6 shows an example flowchart of an anti-vortex induced vibration process of a pitch system 120 according to another exemplary embodiment of the present disclosure.

FIG. 6 shows an example flowchart of an anti-vortex induced vibration process of a normal voltage pitch system 120 according to an exemplary embodiment of the present disclosure. The flowchart of FIG. 6 is only applicable for the unplanned power-off anti-vortex induced vibration mode.

As shown in FIG. 6, in a case of an unplanned power-off, in step 601, a pitch system 120 may determine whether there is a rotatory fault or a blade stuck. If there is the rotatory fault or the blade stuck ("Yes" in step 601), a current process ends since an anti-vortex induced vibration process may not be performed. If there is no rotatory fault or blade stuck ("No" in step 601), it may be determined in step 602 whether a pitch angle of an anti-vortex induced vibration blade is smaller than an anti-vortex induced vibration pitch angle. If the pitch angle of the anti-vortex induced vibration blade is greater than the anti-vortex induced vibration pitch angle ("No" in step 602), as mentioned above, in this case, due to a protection function of a safety chain of the wind turbine, the anti-vortex induced vibration blade cannot open to a small angle. Therefore, the current process ends. If the pitch angle of the anti-vortex induced vibration blade is less than the anti-vortex induced vibration pitch angle ("Yes" in step 602), the pitch system 120 may enter an anti-vortex induced vibration mode in step 603 and trigger a window period in step 604. Then, in step 605, it may be determined whether it is in the window period or not at present. If it is in the window period ("Yes" in step 605), an feedback of anti-vortex induced vibration mode on is sent to a main control system 110 in step 606 to indicate entering of the anti-vortex induced vibration mode. In step 607, an anti-vortex induced vibration blade is selected and a position comparison function of the anti-vortex induced vibration blade is blocked. In step 608, the pitch system 120 may adjust a position of the anti-vortex induced vibration blade of the wind turbine and determine whether the pitch angle of the anti-vortex induced vibration blade reaches the anti-vortex induced vibration pitch angle. If the pitch angle of the anti-vortex induced vibration blade reaches the anti-vortex induced vibration pitch angle ("Yes" in step 608), a pitch driver enabling signal is cut off by the pitch system 120 in step 609 (in order to ensure that the blade may stop in a range of (40±1°), for example, and an action of cutting off the enabling signal may be started at 39°). Then, in step 610, it is determined whether pitch angles of other blades reaches a shutdown pitch angle. If the pitch angles of other blades do not reach the shutdown pitch angle ("No" in step 610), the process returns to step 610 to continue adjusting the pitch angles of other blades. If the pitch angles of other blades reach the shutdown pitch angle ("Yes" in step 610), an anti-vortex induced vibration function completion feedback may be sent to the main control system 110 in step 611 to indicate completion of the anti-vortex induced vibration function. In step 612, the pitch driver enabling signal may be written into a power-down holding area (the order of step 611 and step 612 may also be interchanged). Step 613 to step 619 are similar to step 515 to step 521 in FIG. 5, which are not described in detail.

Figure 7:
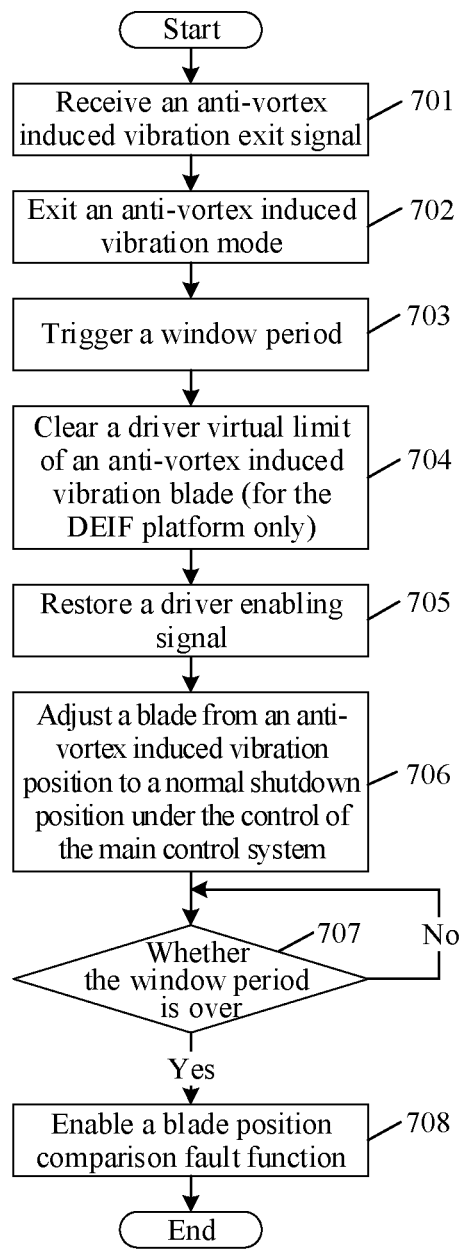
FIG. 7 shows an example flowchart of a process of exiting an anti-vortex induced vibration mode of a pitch system 120 according to another exemplary embodiment of the present disclosure.

FIG. 7 shows an example flowchart of a process of exiting an anti-vortex induced vibration mode of a normal voltage pitch system 120 according to an exemplary embodiment of the present disclosure. In an exemplary embodiment of the present disclosure, the process is initiated and controlled by a main control system 110, and the main control system 110 may send an anti-vortex induced vibration exit signal to a pitch system 120 to enable the pitch system 120 to exit an anti-vortex induced vibration mode.

In an exemplary embodiment of the present disclosure, the main control system 110 may send an anti-vortex induced vibration exit signal in a case that the exit conditions for the anti-vortex induced vibration mode described above are met.

With reference to FIG. 7, in step 701, a pitch system 120 may receive an anti-vortex induced vibration exit signal sent by a main control system 110, exit an anti-vortex induced vibration mode in step 702 and trigger a window period in step 703. Then, a driver virtual limit of an anti-vortex induced vibration blade may be cleared in step 704 (which is only performed for the DEIF platform, and may be omitted for other platforms). In step 705, a pitch driver enabling signal of the anti-vortex induced vibration blade is restored. Then, in step 706, under the control of the main control system 110, blades are pitched from an anti-vortex induced vibration position (90°, −90°, and −40°) to a normal shutdown position (90°, −90°, and −90°). Then, it may be determined in step 707 whether the window period is over. If the window period is not over ("No" in step 706), the pitch system 120 continues to wait. If the window period is over ("Yes" in step 707), in step 708, the pitch system 120 may cancel blocking of a position comparison function of the blade (i.e., enable the position comparison function of the blade), so that the blade may resume normal operation.

The anti-vortex induced vibration process and the process of exiting the anti-vortex induced vibration mode of the normal voltage pitch system have been described above with reference to FIGS. 5 to 7. However, it should be understood that the anti-vortex induced vibration process and the process of exiting the anti-vortex induced vibration mode of a low-voltage pitch system do not include steps related to the driver virtual limit because the low-voltage pitch system does not use the DEIF platform. In addition, in the low-voltage pitch system, in the unplanned power-off anti-vortex induced vibration mode, if there is a communication fault between a main control and a pitch after power-off of a box transformer, an anti-vortex induced vibration mode is not entered, while other steps are similar to those of the normal voltage pitch system, which are not described in detail here for brevity.

Figure 8:
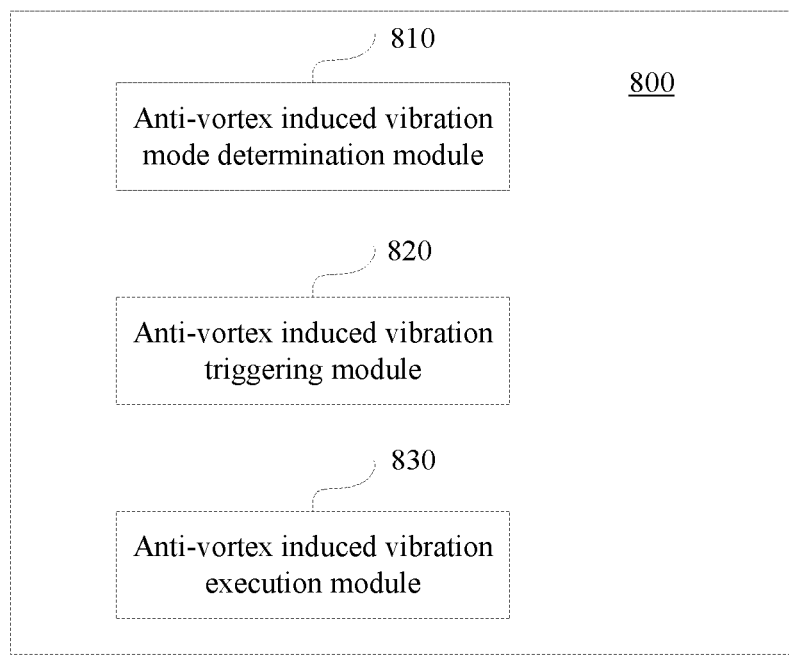
FIG. 8 shows a block diagram of a control apparatus for anti-vortex induced vibration of a wind turbine according to an exemplary embodiment of the present disclosure.

FIG. 8 shows a block diagram of a control apparatus for anti-vortex induced vibration of a wind turbine according to an exemplary embodiment of the present disclosure.

With reference to FIG. 8, a control apparatus 800 for anti-vortex induced vibration according to an exemplary embodiment of the present disclosure may include an anti-vortex induced vibration mode determination module 810, an anti-vortex induced vibration triggering module 820 and an anti-vortex induced vibration execution module 830.

In an exemplary embodiment of the present disclosure, the anti-vortex induced vibration mode determination module 810 may be configured to determine whether the wind turbine enters an anti-vortex induced vibration mode. Here, the anti-vortex induced vibration mode may include a shutdown anti-vortex induced vibration mode, a planned power-off anti-vortex induced vibration mode, an unplanned power-off anti-vortex induced vibration mode, and a forced anti-vortex induced vibration mode. The anti-vortex induced vibration mode determination module 810 may determine whether an anti-vortex induced vibration start signal is received from a main control system of the wind turbine or whether a first preset condition for the unplanned power-off anti-vortex induced vibration mode is met, and determine that the wind turbine enters the anti-vortex induced vibration mode, in response to receiving the anti-vortex induced vibration start signal from the main control system or meeting the first preset condition for the unplanned power-off anti-vortex induced vibration mode. Here, the anti-vortex induced vibration start signal is sent by the main control system in a case that a second preset condition for the shutdown anti-vortex induced vibration mode, a third preset condition for the planned power-off anti-vortex induced vibration mode or a fourth preset condition for the forced anti-vortex induced vibration mode is met.

In an exemplary embodiment of the present disclosure, the first preset condition may include a condition in which the wind turbine is unplanned powered-off and a pitch angle of the blade of the wind turbine is smaller than an anti-vortex induced vibration pitch angle during unplanned power-off of the wind turbine. The second preset condition may include a condition in which the wind turbine is in a shutdown state and a shutdown anti-vortex induced vibration function is enabled. The third preset condition may include a condition in which the wind turbine is in a shutdown state and a planned power-off anti-vortex induced vibration function is enabled. The fourth preset condition may include a condition in which the wind turbine is in a shutdown or maintenance state and a forced anti-vortex induced vibration function is enabled.

In an exemplary embodiment of the present disclosure, a length of the window period may be determined based on a preset pitch rate and a preset compensation time for a pitch driver of the wind turbine.

In an exemplary embodiment of the present disclosure, in a case of adjusting a blade of the wind turbine to a preset anti-vortex induced vibration position, the anti-vortex induced vibration execution module 830 may block a position comparison function of an anti-vortex induced vibration blade; adjust a pitch angle of the anti-vortex induced vibration blade at the preset pitch rate; determine whether the pitch angle of the anti-vortex induced vibration blade is adjusted to a preset anti-vortex induced vibration pitch angle; and determine that the blade of the wind turbine reaches the preset anti-vortex induced vibration position, in response to the pitch angle of the anti-vortex induced vibration blade being adjusted to the preset anti-vortex induced vibration pitch angle and other blades except the anti-vortex induced vibration blade being at a normal shutdown pitch angle.

In an exemplary embodiment of the present disclosure, after the pitch angle of the anti-vortex induced vibration blade is adjusted to the preset anti-vortex induced vibration pitch angle, the anti-vortex induced vibration execution module 830 may further cut off, based on a pitch driver enabling cut-off signal sent by a main control system of the wind turbine, a pitch driver enabling signal of the anti-vortex induced vibration blade to maintain the pitch angle of the anti-vortex induced vibration blade.

In an exemplary embodiment of the present disclosure, the control apparatus 800 for anti-vortex induced vibration may further include an anti-vortex induced vibration exit execution module (not shown) which is configured to: exit the anti-vortex induced vibration mode in response to the wind turbine meeting a preset exit condition.

In an exemplary embodiment of the present disclosure, in a case of receiving an anti-vortex induced vibration exit signal from the main control system of the wind turbine, the exit anti-vortex induced vibration execution module (not shown) may restore the pitch driver enabling signal of the anti-vortex induced vibration blade and trigger a window period, adjust the blade of the wind turbine to a shutdown position in the window period, and enable the position comparison function of the anti-vortex induced vibration blade. Here, the anti-vortex induced vibration exit signal is sent by the main control system in a case that an exit condition is detected. In addition, in a case that a pitch fault is detected in the anti-vortex induced vibration mode, the anti-vortex induced vibration exit execution module (not shown) may restore the pitch driver enabling signal of the anti-vortex induced vibration blade and enable the position comparison function of the anti-vortex induced vibration blade.

A control method and system for anti-vortex induced vibration of a wind turbine according to an exemplary embodiment of the present disclosure may be applied to various application scenarios such as before the wind turbine is powered on, in a case that the wind turbine is in operation, a power grid is powered down, a wind turbine is maintained, or anti-vortex induced vibration is exited. Tables 1 to 5 below illustrate some specific examples in these application scenarios, corresponding working conditions, shutdown angles after implementing the control scheme for anti-vortex induced vibration of the present disclosure (i.e., angles of blades after implementing the control scheme for anti-vortex induced vibration of the present disclosure) and implementation schemes.

TABLE 1

| Application scenario before the wind turbine is powered on | | |
|---|---|---|
| Scenario | Shutdown angle | Implementation scheme |
| Not debugged | 90°-90°-40° | 1. Manual operation during hoisting<br>2. Installation of a turbulence block at a tower |
| Static adjustment completed | 90°-90°-40° | 1. Manual triggering of an anti-vortex induced vibration command at the bottom of a tower<br>2. Manual yaw to be aligned with the wind at the bottom of a tower |

TABLE 2

| Application scenario in a case that the wind turbine is in operation | | | |
|---|---|---|---|
| Scenario | Working condition | Shutdown angle | Implementation scheme |
| Fault-free shutdown | 1, No pitch fault<br>2. No yaw fault<br>3. Not trigger a safety chain of a pitch<br>4. A power grid is not powered off | 90°-90°-40° | 1. A main control system first stops at 90°, -90°, -90°, and adjusts an anti-vortex induced vibration blade to 40°<br>2. Automatic yaw to be aligned with the wind |
| Fault shutdown | Non-pitch fault and Non-yaw fault and Non-power grid fault and a safety chain of a pitch is not triggered | 90°-90°-40° | 1. A main control system first stops at 90°, -90°, -90°, and adjusts an anti-vortex induced vibration blade to 40°<br>2. Automatic yaw to be aligned with the wind |
| | Yaw fault | | A main control system first stops at 90°, -90°, -90°, and adjusts an anti-vortex induced vibration blade to 40° |
| | Pitch fault (including all pitch faults such as stuck pitch and pitch position comparison) Trigger a safety chain of a pitch | 90°-90°-90° | Automatic yaw to be aligned with the wind |
| | Yaw fault and pitch fault | | Small probability, which requires to be repaired as soon as possible | c) Power-Down of a Power Grid

TABLE 3

| Application scenario in a case that a power grid is powered down | | | |
|---|---|---|---|
| Scenario | Working condition | Shutdown angle | Implementation scheme |
| Planned power-down | — | 90°-90°-40° | 1. A main control system first stops at 90°, -90°, -90°, and then adjusts an anti-vortex induced vibration blade to 40° |
| Unplanned power-down | In a case of power-down, a position of a blade is less than 40°, and there is no rotatory (weaving) fault and no blade stuck | 90°-90°-40° | 1. In a pitch system, when a blade is retracted to 40°, driver RUN enabling of an anti-vortex induced vibration blade is cut off, and the anti-vortex induced vibration blade is stopped at 40°<br>2. Other blades are retracted to 90° |

TABLE 3-continued

Application scenario in a case that a power grid is powered down

| Scenario | Working condition | Shutdown angle | Implementation scheme |
|---|---|---|---|
| | In a case of power-down, a position of a blade is greater than 40° Rotatory (weaving) fault Any blade is stuck | 90°-90°-90° | Automatic anti-vortex induced vibration fails to be completed. Thus, standby power is required to supply power to a wind turbine, and a manual standby-power anti-vortex induced vibration is performed after handling the fault. |

TABLE 4

Application scenarios in a case that a wind turbine is maintained

| Scenario | Working condition | Shutdown angle | Implementation scheme |
|---|---|---|---|
| Trigger a maintenance switch at the bottom of a tower or in nacelle | No fault | 90°-90°-40° | 1. A main control system first stops at 90°, -90°, -90°, and an anti-vortex induced vibration mode may be forced to be entered manually<br>2. Automatic yaw to be aligned with a wind |
| | Yaw fault (yaw motor fault or wind vane fault) | | A main control system first stops at 90°, -90°, -90°, and an anti-vortex induced vibration mode may be forced to be entered manually |
| | Pitch fault | 90°-90°-90° | Automatic yaw to be aligned with the wind |
| | Yaw fault and pitch fault | | Small probability, which requires to be repaired as soon as possible |
| An impeller locked and a safety door closed | Operators work at the bottom of a tower or in nacelle | 90°-90°-40° | Automatic yaw to be aligned with the wind |
| An impeller locked and a safety door opened | Operators work in a hub | 90°-90°-90° | A main control system exits an anti-vortex induced vibration mode, and a pitch system controls blades to retract to safe positions |

TABLE 5

Application scenarios in a case that anti-vortex induced vibration mode is exited

| Scenario | Working condition | Shutdown angle | Implementation scheme |
|---|---|---|---|
| A wind speed is greater than a threshold | Determine windy weather in advance | 90°-90°-90° | In a case that a wind turbine is electrified, it will automatically retract to 90°, -90°, -90°, re-enter 90°, -90°, -40° after a wind speed is met, and yaw to be aligned with a wind automatically<br>In a case that a wind turbine is not electrified, a diesel generator is used for power supply, and 90°, -90°, -90° is manually exited, to yaw to be aligned with a predicted main wind direction |
| A rotating speed is greater than a threshold | Under an anti-vortex induced vibration pitch angle, a rotating speed of a wind turbine exceeds a threshold | 90°-90°-90° | In a case that a wind turbine is electrified, it will automatically retract to 90°, -90°, -90°, re-enter 90°, -90°, -40° after a rotating speed is met, and yaw to be aligned with the wind automatically |
| Out of a window period | An action for an anti-vortex induced vibration blade from 90° to 40° has timed out | 90°-90°-90° | A pitch system exits an anti-vortex induced vibration mode, triggers an anti-vortex induced vibration overtime fault to retract to 90°, -90°, -90°, and yaws to be aligned with the wind automatically |
| Startup | Meet a startup condition | 90°-90°-90° | A main control system controls blades to retract to 90°, -90°, -90° before startup |

With a control method and system for anti-vortex induced vibration of a wind turbine according to an exemplary embodiment of the present disclosure, the wind turbine can automatically resist vortex induced vibration in various conditions (for example, an operation stage, a maintenance stage, a fault in a power grid), thus reducing the human workload and the economic loss. On the other hand, in some specific working conditions, considering the safety of the wind turbine, the wind turbine can also automatically exit an anti-vortex induced vibration mode to prevent the wind turbine from falling down and ensure the safety of the wind turbine. As a result, a fatigue load of the wind turbine and the economic loss can be reduced.

The control method and system for anti-vortex induced vibration of the wind turbine according to exemplary embodiments of the present disclosure have been described above with reference to FIGS. 1 to 8. However, it should be understood that apparatuses and systems shown in the drawings may be configured as software, hardware, firmware or any combination thereof, respectively, to perform specific functions. For example, these systems and apparatuses may correspond to special-purpose integrated circuits, pure software codes, or modules combining software and hardware. In addition, one or more functions implemented by these systems or apparatuses may further be uniformly executed by components in a physical entity device (such as a processor, a client or a server).

For example, according to an exemplary embodiment of the present disclosure, a computer-readable storage medium storing instructions may be provided. The instructions, when executed by at least one computing apparatus, cause the at least one computing apparatus to: determine whether the wind turbine enters an anti-vortex induced vibration mode; in response to the wind turbine entering the anti-vortex induced vibration mode, enable an anti-vortex induced vibration function and trigger a window period; and adjust a blade of the wind turbine to a preset anti-vortex induced vibration position in the window period, where the window period indicates a minimum time required to complete the anti-vortex induced vibration function.

The instructions stored in the computer-readable storage medium may be executed in an environment deployed in a computer device such as a client, a host, an agent apparatus, or a server. It should be noted that the instructions may also be used to perform additional steps in addition to the above steps, or more specific processing may be performed when the above steps are performed, and the contents of these additional steps and further processing have been mentioned in the description of the related system and method with reference to FIGS. 1 to 8, and thus will not be described in order to avoid repetition.

It should be noted that a control system and method for anti-vortex induced vibration of a wind turbine according to an exemplary embodiment of the present disclosure may completely rely on the operation of computer programs or instructions to implement corresponding functions, that is, each apparatus corresponds to each step in a functional architecture of the computer program, so that the whole system is called through a special software package (for example, a lib library) to implement corresponding functions.

On the other hand, when the system and the apparatus shown in FIG. 8 are implemented in software, firmware, middleware, or microcode, program codes or code segments for performing corresponding operations may be stored in a computer-readable medium such as a storage medium, so that the corresponding program codes or code segments may be read and executed by at least one processor or at least one computing apparatus to perform the corresponding operations.

For example, according to an exemplary embodiment of the present disclosure, a computer device including a readable medium storing computer program instructions may be provided. The instructions, when executed by at least one computing apparatus, cause the at least one computing apparatus to: determine whether the wind turbine enters an anti-vortex induced vibration mode; in response to the wind turbine entering the anti-vortex induced vibration mode, turn on an anti-vortex induced vibration function and trigger a window period; and adjust a blade of the wind turbine to a preset anti-vortex induced vibration position in the window period, where the window period indicates a minimum time required to complete the anti-vortex induced vibration function.

The invention claimed is:

1. A control method for countering vortex-induced vibration of a wind turbine, applied to a pitch system of the wind turbine, comprising:

determining whether to enable the wind turbine to enter a vortex-induced vibration countering mode;

in response to determining to enable the wind turbine to enter the vortex-induced vibration countering mode, controlling the wind turbine to enter the vortex-induced vibration countering mode in which a vortex-induced vibration countering function is enabled and a window period is triggered; and adjusting blades of the wind turbine to a preset vortex-induced vibration countering arrangement in the window period, the blades comprising a vortex-induced vibration countering blade, a first blade, and a second blade, wherein in the preset vortex-induced vibration countering arrangement, each of pitch angles of the first blade and the second blade is a normal shutdown pitch angle, and a pitch angle of the vortex-induced vibration countering blade is a preset vortex-induced vibration countering pitch angle, the preset vortex-induced vibration countering pitch angle being different from the normal shutdown pitch angle, and wherein the window period indicates a minimum time to complete the vortex-induced vibration countering function, and a length of the window period is determined based on a preset compensation time for a pitch driver of the wind turbine and a preset pitch rate.

2. The method according to claim 1, wherein the vortex-induced vibration countering mode is a shutdown vortex-induced vibration countering mode, a planned power-off vortex-induced vibration countering mode, an unplanned power-off vortex-induced vibration countering mode, or a forced vortex-induced vibration countering mode, wherein the determining whether to enable the wind turbine to enter a vortex-induced vibration countering mode, and in response to determining to enable the wind turbine to enter the vortex-induced vibration countering mode, controlling the wind turbine to enter the vortex-induced vibration countering mode, comprises:

determining whether a vortex-induced vibration countering start signal is received from a main control system of the wind turbine or whether a first preset condition for the unplanned power-off vortex-induced vibration countering mode is met, wherein the vortex-induced vibration countering start signal is sent by the main control system in a case that a second preset condition for the shutdown vortex-induced vibration countering n mode, a third preset condition for the planned power-off vortex-induced vibration countering mode or a fourth preset condition for the forced vortex-induced vibration countering mode is met; and determining, in response to receiving the vortex-induced vibration countering start signal from the main control system or meeting the first preset condition for the unplanned power-off vortex-induced vibration countering mode, to enable the wind turbine to enter the vortex-induced vibration countering mode, and controlling the wind turbine to enter the vortex-induced vibration countering mode.

3. The method according to claim 2, wherein
the first preset condition comprises a condition in which the pitch angle of the vortex-induced vibration countering blade is smaller than the vortex-induced vibration countering pitch angle during unplanned power-off of the wind turbine;
the second preset condition comprises a condition in which the wind turbine is in a shutdown state and a shutdown vortex-induced vibration countering function is enabled;
the third preset condition comprises a condition in which the wind turbine is in a shutdown state and a planned power-off vortex-induced vibration countering function is enabled; and
the fourth preset condition comprises a condition in which the wind turbine is in a shutdown state or a maintenance state and a forced vortex-induced vibration countering function is enabled.

4. The method according to claim 1, wherein the adjusting blades of the wind turbine to a preset vortex-induced vibration countering arrangement in the window period comprises:
blocking a position comparison function of the vortex-induced vibration countering blade, wherein the position comparison function for a blade is configured to determine whether the blade is at the normal shutdown pitch angle;
performing the following adjusting steps on the blades of the wind turbine:
determining whether the pitch angle of the vortex-induced vibration countering blade is the preset vortex-induced vibration countering pitch angle, and determining whether the pitch angles of the first blade and the second blade are the normal shutdown pitch angle respectively; and
adjusting the pitch angle of the vortex-induced vibration countering blade to the preset vortex-induced vibration countering pitch angle at the preset pitch rate if determining that the pitch angle of the vortex-induced vibration countering blade is not the preset vortex-induced vibration countering pitch angle; and
if determining that any one of the pitch angles of the first blade and the second blade is not the normal shutdown pitch angle, adjusting a pitch angle, that is determined to be not the normal shutdown pitch angle, of the pitch angles of the first blade and the second blade to the normal shutdown pitch angle; and
determining that the blades of the wind turbine are in the preset vortex-induced vibration countering arrangement, in response to the pitch angle of the vortex-induced vibration countering blade is the preset vortex-induced vibration countering pitch angle and the pitch angles of the first blade and the second blade being the normal shutdown pitch angle respectively.

5. The method according to claim 4, wherein after determining that the pitch angle of the vortex-induced vibration countering blade is the preset vortex-induced vibration countering pitch angle, the method further comprises:
cutting off, in response to a pitch driver enabling cut-off signal sent by a main control system of the wind turbine, a pitch driver enabling signal of the vortex-induced vibration countering blade to maintain the pitch angle of the vortex-induced vibration countering blade.

6. The method according to claim 5, further comprising:
controlling the wind turbine to exit the vortex-induced vibration countering mode in response to the wind turbine meeting a preset exit condition.

7. The method according to claim 6, wherein the controlling the wind turbine to exit the vortex-induced vibration countering mode comprises:
in a case of receiving a vortex-induced vibration countering exit signal from the main control system of the wind turbine, triggering an exit window period and restoring the pitch driver enabling signal of the vortex-induced vibration countering blade, adjusting the blades of the wind turbine to a shutdown arrangement in the exit window period, and enabling the position comparison function of the vortex-induced vibration countering blade when the exit window period is over, wherein the vortex-induced vibration countering exit signal is sent by the main control system in a case that the preset exit condition is detected, and a length of the exit window period is equal to the length of the window period, and wherein in the shutdown arrangement, each of the blades is at the normal shutdown pitch angle, or
if detecting a pitch fault in the vortex-induced vibration countering mode, restoring the pitch driver enabling signal of the vortex-induced vibration countering blade and enabling the position comparison function of the vortex-induced vibration countering blade.

8. A controller for countering vortex-induced vibration of a wind turbine, comprising:
a vortex-induced vibration countering mode determination module, configured to determine whether to enable the wind turbine to enter a vortex-induced vibration countering mode;
a vortex-induced vibration countering triggering module, configured to, in response to determining to enable the wind turbine to enter the vortex-induced vibration countering mode, controlling wind turbine to enter the vortex-induced vibration countering mode in which a vortex-induced vibration countering function is enabled and a window period is triggered; and
a vortex-induced vibration countering execution module, configured to adjust blades of the wind turbine to a preset vortex-induced vibration countering arrangement in the window period, the blades comprising a vortex-induced vibration countering blade, a first blade, and a second blade, wherein in the preset vortex-induced vibration countering arrangement, each of pitch angles of the first blade and the second blade is a normal shutdown pitch angle, and a pitch angle of the vortex-induced vibration countering blade is a preset vortex-induced vibration countering pitch angle, the preset vortex-induced vibration countering pitch angle being different from the normal shutdown pitch angle, and
wherein the window period indicates a minimum time to complete the vortex-induced vibration countering function, and a length of the window period is determined based on a preset compensation time for a pitch driver of the wind turbine and a preset pitch rate.

9. A control system for countering vortex-induced vibration of a wind turbine, comprising:
- a pitch system, configured to adjust a position of blade of the wind turbines; and
- a main control system, configured to control an operation of the pitch system, wherein the pitch system is further configured to:

determine whether to enable the wind turbine to enter a vortex-induced vibration countering mode;

in response to determining to enable the wind turbine to enter the vortex-induced vibration countering mode, controlling the wind turbine to enter the vortex-induced vibration countering mode in which a vortex-induced vibration countering function is enabled and a window period is triggered; and adjust the blades of the wind turbine to a preset vortex-induced vibration countering arrangement in the window period, the blades comprising a vortex-induced vibration countering blade, a first blade, and a second blade, wherein in the preset vortex-induced vibration countering arrangement, each of pitch angles of the first blade and the second blade is a normal shutdown pitch angle, and a pitch angle of the vortex-induced vibration countering blade is a preset vortex-induced vibration countering pitch angle, the preset vortex-induced vibration countering pitch angle being different from the normal shutdown pitch angle, and wherein the window period indicates a minimum time to complete the vortex-induced vibration countering function, and a length of the window period is determined based on a preset compensation time for a pitch driver of the wind turbine and a preset pitch rate.

10. A computer-readable storage medium storing a computer program which, when executed by a processor, causes the processor to execute the control method for countering vortex-induced vibration of a wind turbine according to claim 1.

11. An electronic device, comprising:
- a processor; and
- a memory configured to store a computer program which, when executed by the processor, causes the processor to execute the control method for countering vortex-induced vibration of a wind turbine according to claim 1.

* * * * *